United States Patent
Liu et al.

(10) Patent No.: US 10,430,255 B2
(45) Date of Patent: *Oct. 1, 2019

(54) APPLICATION PROGRAM INTERFACE MASHUP GENERATION

(71) Applicant: FUJITSU LIMITED, Kawasaki-shi, Kanagawa (JP)

(72) Inventors: Lei Liu, San Jose, CA (US); Wei-Peng Chen, Fremont, CA (US); Qinghan Xue, Sunnyvale, CA (US)

(73) Assignee: FUJITSU LIMITED, Kawasaki (JP)

( * ) Notice: Subject to any disclaimer, the term of this patent is extended or adjusted under 35 U.S.C. 154(b) by 108 days.

This patent is subject to a terminal disclaimer.

(21) Appl. No.: 15/727,540

(22) Filed: Oct. 6, 2017

(65) Prior Publication Data

US 2019/0004873 A1      Jan. 3, 2019

Related U.S. Application Data

(63) Continuation-in-part of application No. 15/641,196, filed on Jul. 3, 2017, now Pat. No. 10,191,786.

(60) Provisional application No. 62/529,458, filed on Jul. 6, 2017.

(51) Int. Cl.
   *G06F 9/54*     (2006.01)
   *G06F 16/903*   (2019.01)

(52) U.S. Cl.
   CPC ........ *G06F 9/541* (2013.01); *G06F 16/90335* (2019.01)

(58) Field of Classification Search
   CPC .......................... G06F 9/541; G06F 16/90335
   See application file for complete search history.

(56) References Cited

U.S. PATENT DOCUMENTS

| | | | |
|---|---|---|---|
| 2006/0156253 A1* | 7/2006 | Schreiber | G06F 16/84 715/835 |
| 2014/0337372 A1* | 11/2014 | Lee | G06F 8/30 707/767 |

OTHER PUBLICATIONS

U.S. Appl. No. 15/641,196, filed Jul. 3, 2017.

(Continued)

*Primary Examiner* — S. Sough
*Assistant Examiner* — Kimberly L Jordan
(74) *Attorney, Agent, or Firm* — Maschoff Brennan

(57) ABSTRACT

A method of generating application program interface (API) mashups is provided. The method may include grouping a plurality of APIs into a plurality of sub-clusters based on at least one keyword for each API of the plurality of APIs. The method may also include identifying a plurality of keyword combinations for the plurality of sub-clusters based on real-world data and two or more keywords for the plurality of sub-clusters. Further, the method may include determining a plurality of possible API mashups including two or more APIs of the plurality of APIs for the plurality of keyword combinations. The method may also include processing the plurality of possible API mashups to generate at least one prioritized API mashup of the plurality of possible API mashups, the at least one prioritized API mashup associated with at least one keyword combination of the plurality of keyword combinations.

20 Claims, 13 Drawing Sheets

(56) References Cited

OTHER PUBLICATIONS

U.S. Appl. No. 15/374,798, filed Dec. 9, 2016.
Gu, Xiaodong, et al. "Deep API learning." Proceedings of the 2016 24th ACM SIGSOFT International Symposium on Foundations of Software Engineering. ACM, 2016, first page.
Gao, Wei, et al. "Manifold-learning based API recommendation for mashup creation." Web Services (ICWS), 2015 IEEE International Conference on. IEEE, 2015, first page.

* cited by examiner

APPLICATION PROGRAM INTERFACE MASHUP GENERATION

CROSS-REFERENCE TO RELATED APPLICATIONS

This present application claims the benefit of U.S. Patent Provisional Application No. 62/529,458, filed Jul. 6, 2017, and is a continuation-in-part of U.S. patent application Ser. No. 15/641,196, filed Jul. 3, 2017. The foregoing applications are incorporated herein by reference in their entireties.

FIELD

The embodiments discussed herein relate to application program interface (API) mashups.

BACKGROUND

An application programming interface (API) is a set of protocols, commands, definitions, and tools for creating application software. An API may specify how software components should interact and how APIs are used when programming graphical user interface (GUI) components or implementing services or functions. An API mashup is a plurality of APIs functioning together in order to provide new or value-added services.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include grouping a plurality of APIs into a plurality of sub-clusters based on at least one keyword for each API of the plurality of APIs. The method may also include identifying a plurality of keyword combinations for the plurality of sub-clusters based on real-world data and two or more keywords for the plurality of sub-clusters. Further, the method may include determining a plurality of possible API mashups including two or more APIs of the plurality of APIs for the plurality of keyword combinations. The method may also include processing the plurality of possible API mashups to generate at least one prioritized API mashup of the plurality of possible API mashups, the at least one prioritized API mashup associated with at least one keyword combination of the plurality of keyword combinations.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Various embodiments disclosed herein relate to application program interface (API) mashup generation. In some embodiments, API mashups may be automatically identified and/or generated based on real-world data via text mining and/or natural language processing techniques. According to various embodiments, API mashups may be identified and/or generated based on word embedding (e.g., character and/or sentence-based word embedding) and/or named entity recognition (e.g., combination of different datasets for named entity recognition).

Further, some embodiments may further be related to processing (e.g., filtering, recommending, ranking, and/or identifying plausible API mashups) to generate refined (e.g., prioritized) API mashups. Further, the refined API mashups may be provided to one or more application developers. More specifically, in some embodiments, identified (e.g., generated) API mashups may be, for example, filtered, tested, and/or ranked, such that one or more most suitable API mashups may recommended (e.g., with high priority). Some embodiments may include online processing to facilitate the prediction of whether or not several APIs can be used for a plausible API mashup and/or whether or not APIs may be introduced to enhance performance.

According to some embodiments, API mashups may be ranked based on the real-world data, and thus application developers may not be required to search API methods to verify feasibility and usefulness of identified and/or generated API mashups. Embodiments disclosed herein are not limited to any particular use case, but rather may be used to develop applications for any suitable use case.

Conventionally, due to the huge number of available APIs, identifying suitable APIs to use in an application was burdensome and may have required manual and time-consuming searches across a diverse set of websites. Furthermore, information was primarily limited to a single API. Therefore, to develop an application by utilizing multiple APIs, developers needed to search and select APIs, understand each API by reviewing documentation, and verify inputs and outputs to determine whether these APIs may be combined as an API mashup.

Embodiments of the present disclosure will be explained with reference to the accompanying drawings.

Figure 1:
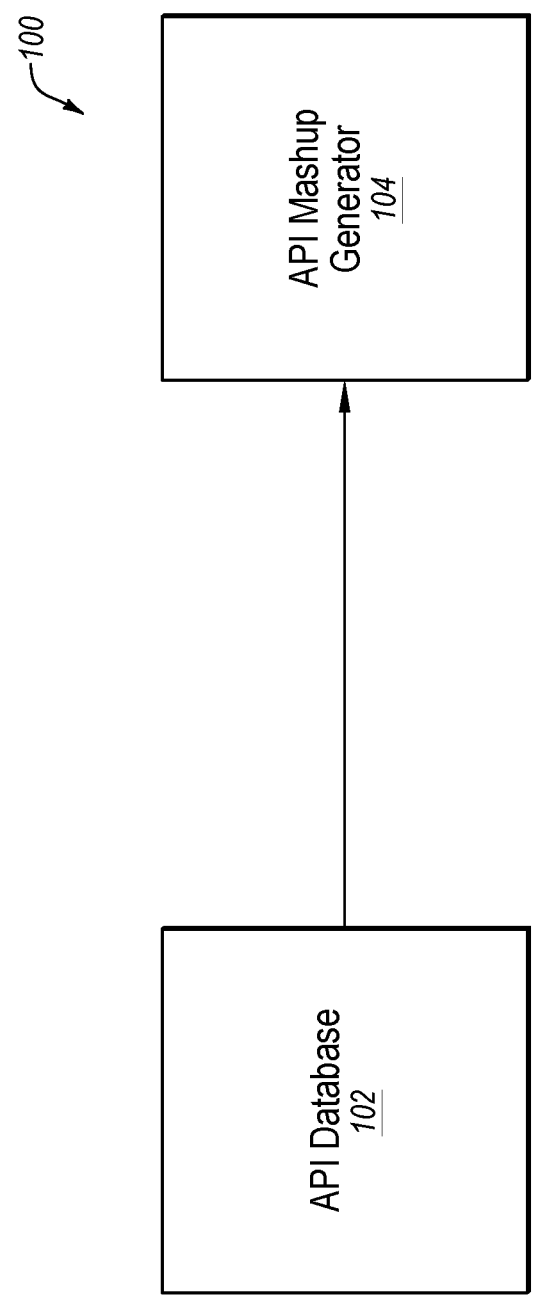
FIG. 1 a block diagram of an example system including an API mashup generator.

FIG. 1 is a block diagram of an example API mashup generation system 100 including an API database 102 and an API mashup generator 104. API database 102 may include a plurality of APIs (e.g., API1-APIn) and, in some embodiments, various API data, such as API endpoints, parameters, and their descriptions. API database 102 may include any computer-based source for APIs and/or API data. For example, API database 102 may include a server, client computer, repository, etc. API database 102 may store APIs and API data in any electronic format. Further, the API data may be machine-readable and/or human readable. The API data may be in any language. For example, the API data may be in any target human language (e.g., English, Japanese, German, etc.). The API may be in any structured data format. For example, the API data may be in Open API specification, JavaScript Object Notation (JSON), Extensible Markup Language (XML), etc.

Each API of API database 102 may be associated with primary-category keywords (e.g., medical), second-category keywords (e.g., healthcare, business, office, etc.), an API description, and other information related to APIs (e.g. endpoints, HTTP methods, parameters, and their descriptions). In some embodiments, API category keywords (e.g., primary and secondary category keywords) and/or API descriptions may be defined by a repository (e.g., a public repository, such as the ProgrammableWeb™).

API mashup generator 104 may be configured to receive APIs and/or API data from API database 102 and generate one or more API mashups, according to one or more embodiments as described herein. Further, according to some embodiments, API mashup generator 104 may process the one or more API mashups to generate one or more refined API mashups.

Figure 2:
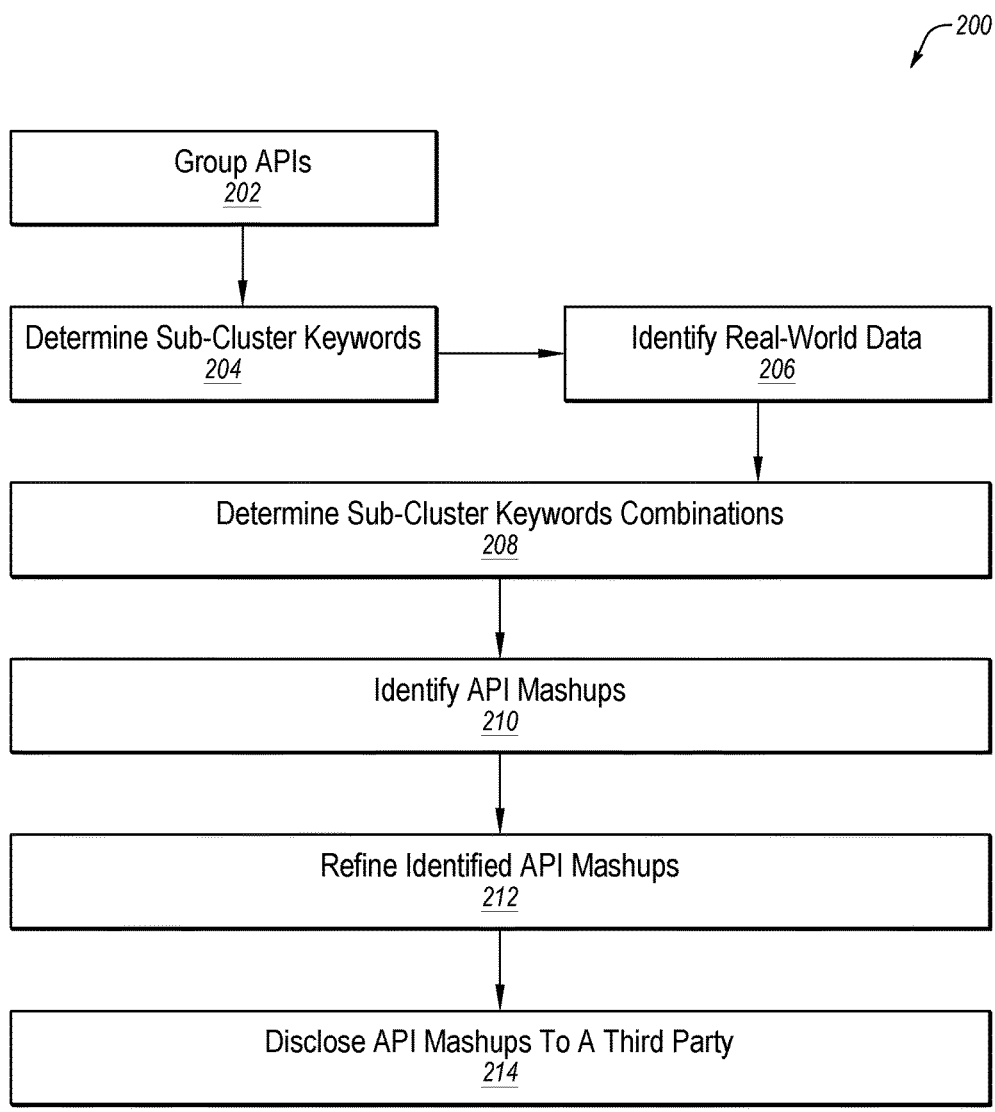
FIG. 2 shows an flow diagram of an example method of generating one or more API mashups.

FIG. 2 shows an example flow diagram of a method 200 of generating one or more API mashups, arranged in accordance with at least one embodiment described herein. Although illustrated as discrete blocks, various blocks may be divided into additional blocks, combined into fewer blocks, or eliminated, depending on the desired implementation.

Figure 13:
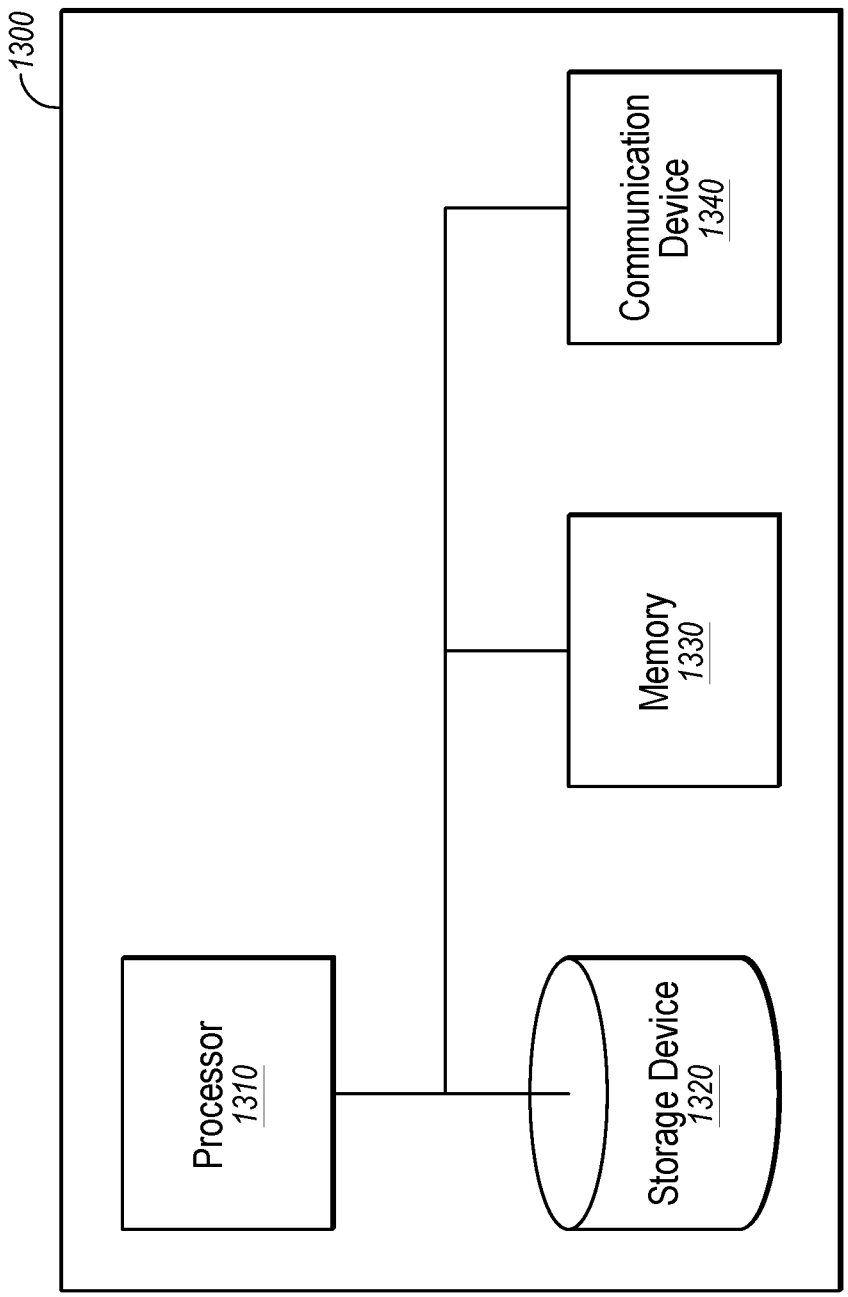
FIG. 13 is a block diagram of an example computing system.

In some embodiments, method 200 may be performed by one or more devices, such as system 100 of FIG. 1 and/or system 1300 of FIG. 13. For instance, processor 1310 of FIG. 13 may be configured to execute computer instructions stored on memory 1330 to perform functions and operations as represented by one or more of the blocks of method 200.

Method 200 may begin at block 202. At block 202, a plurality of APIs may be grouped. In some embodiments, the plurality of APIs may be grouped into categories, clusters, and/or sub-clusters. For example, the APIs, which may be received from a database (e.g., API database 102 of FIG. 1) and/or a various sources (e.g., websites) may be grouped, via at least one processor (e.g., processor 1310 of FIG. 13), according to an API tree structure (e.g., category, cluster, and sub-cluster, or more layers/levels). More specifically, for example, categories for API be generated via determining a frequency of every keyword in both category and primary-category fields of the APIs, ranking and selecting the keywords based on their frequency (e.g., machine classification), and selecting top keywords (e.g., M keywords) as categories for the API.

Further, clusters for APIs in each category may be generated. In some embodiments, text mining and/or natural language processing (NLP) techniques may be used to analyze the secondary category keywords. For example, "stop" and/or general words may be removed, a word stemming operation may be performed, keywords may be counted and ranked based on frequency, and top keywords (e.g., N keywords) may be selected as clusters.

Moreover, sub-clusters for APIs in each cluster may be generated. In some embodiments, via text mining and/or NLP tools and/or techniques, descriptions of the APIs may be analyzed, similarity scores among refined keywords may be measured, and the top keywords (e.g., K keywords) may be selected as sub-clusters. More specifically, in some embodiments, the APIs may be grouped into different sub-clusters based on their categories and descriptions via, for example, text mining and NLP tools and/or techniques. For example, "stop" words and symbols may be removed, keyword types (e.g., noun, verb, etc.) may be determined, a word stemming operation may be performed, keywords may be counted and ranked based on frequency, similarity scores (e.g., using NLP techniques) among the keywords may be measured, and the top keywords (e.g., K keywords) may be selected as sub-clusters. Keyword similarity may be evaluated via any suitable metric (e.g., Levenshtein Distance, Euclidean Distance, Hamming Distance, Simhash, Minhash, Locality-sensitive Hashing (LSH), etc.).

In some embodiments, wherein real-world data is available (e.g., from one or more corresponding websites for each category), sub-cluster keyword combinations may be identified via, for example, named entity recognition and may be based on the sub-cluster keywords and the real-world data when the real-world data is available from one or more corresponding websites for each category.

In other embodiments, wherein real-world data may be unavailable, sub-cluster keyword combinations may be identified via identifying all possible sub-cluster keyword combinations of sub-cluster keywords and/or identifying sub-cluster keyword combination having sub-cluster keywords with a description frequency above a threshold (e.g., 5 occurrences, 10 occurrences, 20 occurrences, etc.).

At block 204, a plurality of sub-cluster keywords may be determined, and method 200 may proceed to block 206. More specifically, for example, the plurality of APIs may be grouped, via at least one processor (e.g., processor 1310 of FIG. 13), into a plurality of sub-clusters based on at least one keyword for each of the plurality of APIs. Although method 200 is illustrated as proceeding from block 204 to block 206, the operation of block 206 may be independent of the operation of block 204. For example, block 204 may proceed to block 208.

Figure 3:
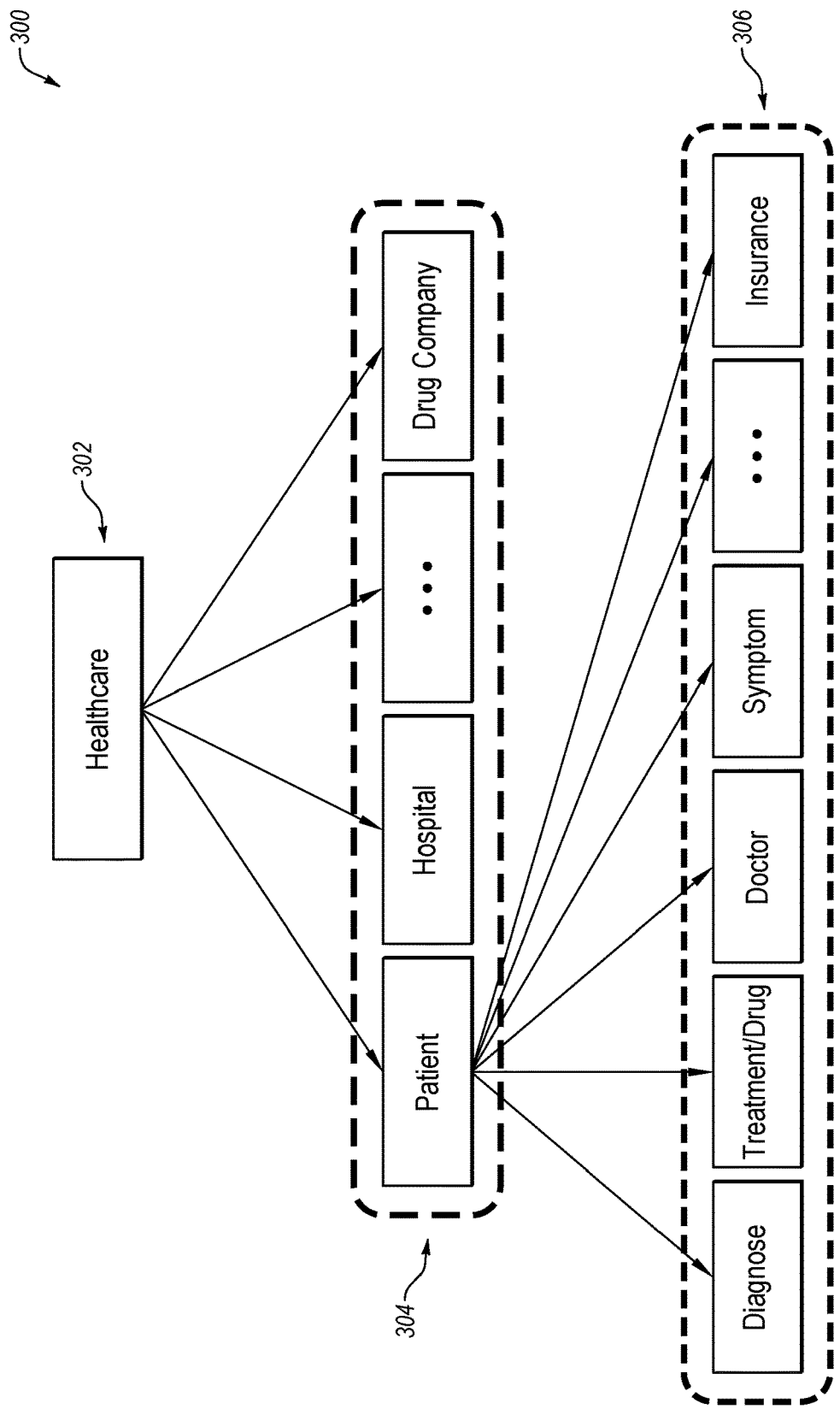
FIG. 3 illustrates an example API tree structure.

With reference to an example tree structure 300 illustrated in FIG. 3, a first level (e.g., a top level) 302 may include a category and/or primary-category keywords, a second level 304 may include secondary-category keywords, and a third level 306 may include keywords (e.g., determined via API descriptions). Third level 306 may include a plurality of sub-clusters, wherein each sub-cluster includes a keyword and one or more (e.g., several) APIs.

Although tree structure 300 is related to a healthcare domain, the present disclosure is not so limited. Rather, the embodiments described herein may be applicable to any domain, such as science, finance, business, education, e-commerce, etc.

Figure 4:
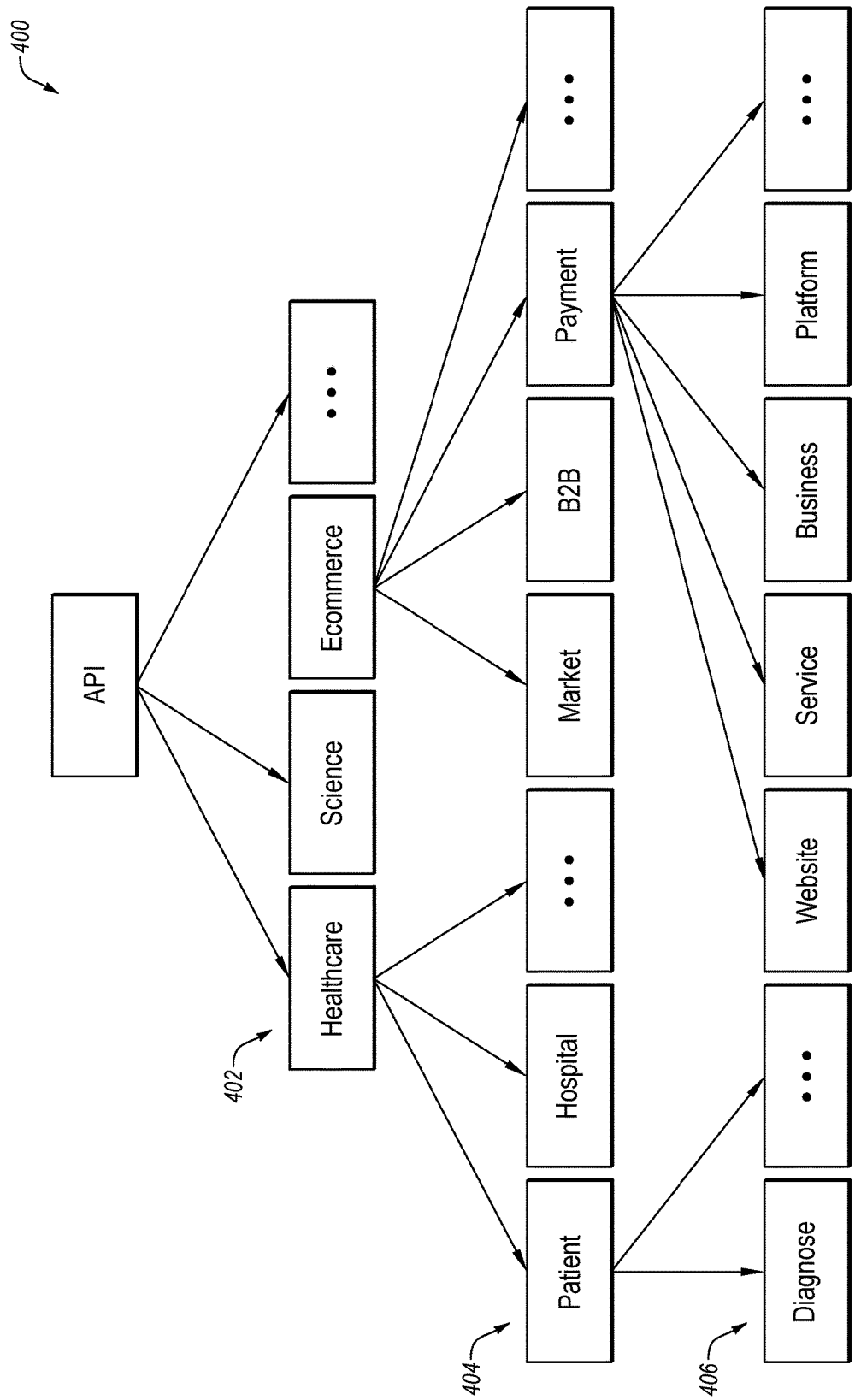
FIG. 4 illustrates another example API tree structure.

FIG. 4 illustrates another example tree structure 400. Structure 400 includes a first level (e.g., top level) 402 including categories and/or primary-category keywords, a second level 404 including secondary-category keywords, and a third level 406 including keywords (e.g., determined via API descriptions). Third level 406 may include a plurality of sub-clusters, wherein each sub-cluster includes a keyword and one or more (e.g., several) APIs. In some embodiments, an API (e.g., authentication API), based on its keywords and description, may be grouped into multiple sub-clusters (e.g., in different domains).

With reference again to method 200 in FIG. 2, at block 206, real-world data (e.g., real-world questions) may be identified, and method 200 may proceed to block 208. For example, real-world data, which may include real-world questions, may be gathered via at least one processor (e.g., processor 1310 of FIG. 13) (e.g., from the Internet via web crawlers). For example, for a healthcare specific domain, patient questions may be extracted from websites, such as professional healthcare related websites. In other example, for other domains, related information may be identified (e.g., via related web blogs) and web crawlers may be used to extract the relevant information. For example, in a finance related domain, data (e.g., questions) may be collected from one or more financial investment blogs (e.g. a Vanguard™ blog).

Figure 5:
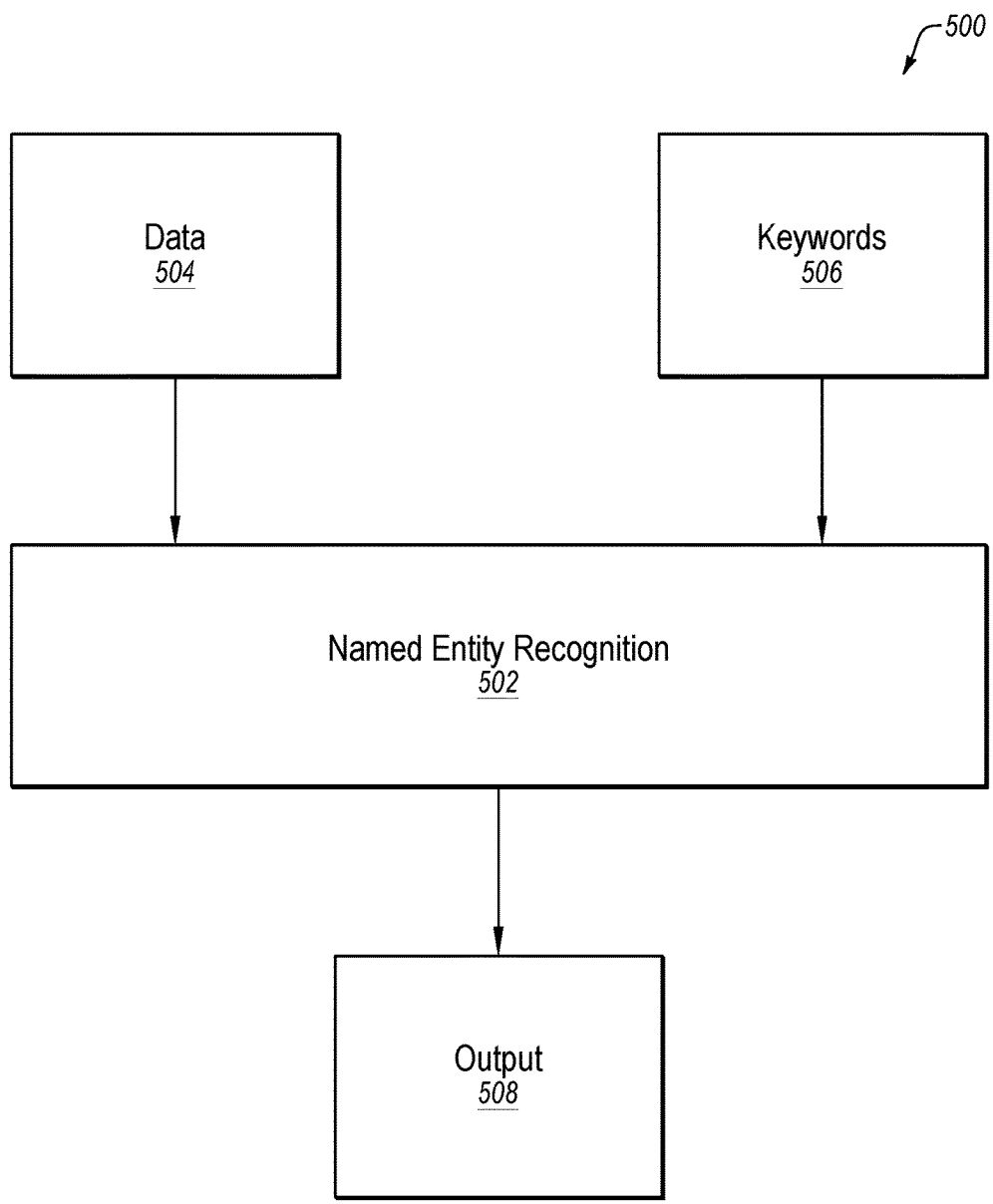
FIG. 5 depicts an example system including a named entity recognition tool.

At block 208, based on the identified data (e.g., real-world data) and the sub-cluster keywords, sub-cluster keyword combinations may be determined, and method 200 may proceed to block 210. As an example, at least one processor (e.g., processor 1310 of FIG. 13) may be used for determining keyword combinations. Further, for example, useful sub-cluster combinations may be determined via named entity recognition techniques. For example, as illustrated in an example system 500 of FIG. 5, a named entity recognition tool 502 may receive data (e.g., real-world data, such as real-world questions) 504 and sub-cluster keywords 506, and generate an output 508 including a list of sub-cluster keyword combinations.

In some embodiments, keyword combination frequencies may be used to determine the popularity of sub-cluster keyword combinations. For example, at least one processor (e.g., processor 1310 of FIG. 13) may be used for determining keyword combination frequencies. For example, approximately 50,000 clinical questions may be processed, and approximately 10,000 sub-cluster keyword combinations may be generated based on the clinical questions. In some embodiments, a keyword combination frequency may incremented when a collected question matches all the keywords for a given combination.

Based on sub-cluster keyword combinations and APIs in each sub-cluster, one or more possible API mashups including two or more APIs of the plurality of APIs may be determined (e.g., via at least one processor (e.g., processor 1310 of FIG. 13)).

At block 210, API mashups may be identified, and method 200 may proceed to block 212. For example, the API mashups may be identified via at least one processor (e.g., processor 1310 of FIG. 13). More specifically, for a given sub-cluster keyword combination, by selecting an API from each sub-cluster, all possible API mashups can be identified. Further, a similarity analysis for each identified possible API mashup may be performed to identify, and possibly rank, API mashups.

For each API in an API mashup, a description may be known. An API description may include a compressive summary for the given API, which may include, but is not limited to, API title and keywords, input/output parameters, API introduction, protocol formats, endpoint descriptions, input/output descriptions, etc. Each part of a description may be obtained and assembled from one or multiple sources (e.g. API related websites). Further, in some embodiments, a word vector for each description may be generated and an average value of a similarity score may be measured. The similarity analysis may be keyword-based, sentence-based, or both. For example, the similarity analysis may be performed via at least one processor (e.g., processor 1310 of FIG. 13).

More specifically, in some embodiments, similarity analysis measurements may be based on descriptions of APIs. More specifically, the descriptions of each API in an API mashup may be separated into sentences, "stop" words and symbols may be removed, a word stemming operation may be performed, and NLP techniques may be used to convert each sentence into a word vector. Further, a hamming distance, for example, or other similarity metrics, among word vectors, may be computed. As one example, an average similarity score may be equal to sum(hamming distances)/total number of computations.

As an example, assuming the description of an API ("API1") includes two sentences (e.g., API1_s1 and API1_s2), and the description of another API ("API2") includes three sentences (e.g., API2_s1, API2_s2, and API2_s3), the hamming distance between every two sentences (Ham(API1_s1, API2_s1)) may be computed, and the similarity score may be equal to (Ham(API1_s1, API2_s1)+Ham(API1_s1, API2_s2)+Ham(API1_s1, API2_s3)+Ham(API1_s2, API2_s1)+Ham(API1_s2, API2_s2)+Ham(API1_s2, API2_s3))/6.

At block 212, the identified API mashups may be refined, and method 200 may proceed to block 214. For example, after API mashups are identified and/or generated based on API description similarity analysis, the results may be filtered to refine and/or rank the identified API mashups (e.g., via at least one processor (e.g., processor 1310 of FIG. 13)), and API mashups may be recommended. For example, the results may be refined and/or ranked via comparing the identified API mashups to one or more public repositories (e.g., API Harmony™, Github™, ProgrammableWeb™, etc.).

More specifically, for example, given a determined API mashup, a repository may be searched to attempt to identify the determined mashup. If the repository identifies the APIs of the determined mashup as being related (e.g., used in a project), the API mashup may be recommended (e.g., with a high priority). For example, Validic™ API and Fitbit™ API are used in some Github™ projects and, thus, an API mashup including Validic™ API and Fitbit™ API may be recommended with a high priority. As another example, for a given API mashup as an input, if related information in at least one repository is located, indicating the APIs in the given API mashup are related, the API mashup may be recommended (e.g., to an application developer) with high priority.

At block 214, API mashups may be disclosed to (e.g., recommended to) one or more third parties (e.g., application developers). For example, after an API mashup has been identified, and possibly ranked, the API mashup may be disclosed to (e.g., recommend to and/or provided to) at least one third party (e.g., an application developer).

Modifications, additions, or omissions may be made to method 200 without departing from the scope of the present disclosure. For example, the operations of method 200 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

In one contemplated example operation, a sub-cluster keyword combination may include "<security, administration>". This keyword combination may be obtained from real-world data collection and analysis. In this example, the "security" sub-cluster, includes a first API "API_1" and a second API "API_2". Further, the "administration" sub-cluster, includes a third API "API_3" and a fourth API "API_4". Continuing with this example, four possible API mashups combinations may be identified (e.g., <API1, API3>, <API1, API4>, <API2, API3>, and <API2, API4>). Further, via APIs descriptions, a similarity score (e.g., determined via a similarity analysis) for each possible API mashup may be calculated to identify API mashups. According to some examples, the greater the similarity score, the more plausible the API mashup. In some embodiments, the identified API mashups may be ranked, and possibly recommended to one or more third parties.

Figure 6:
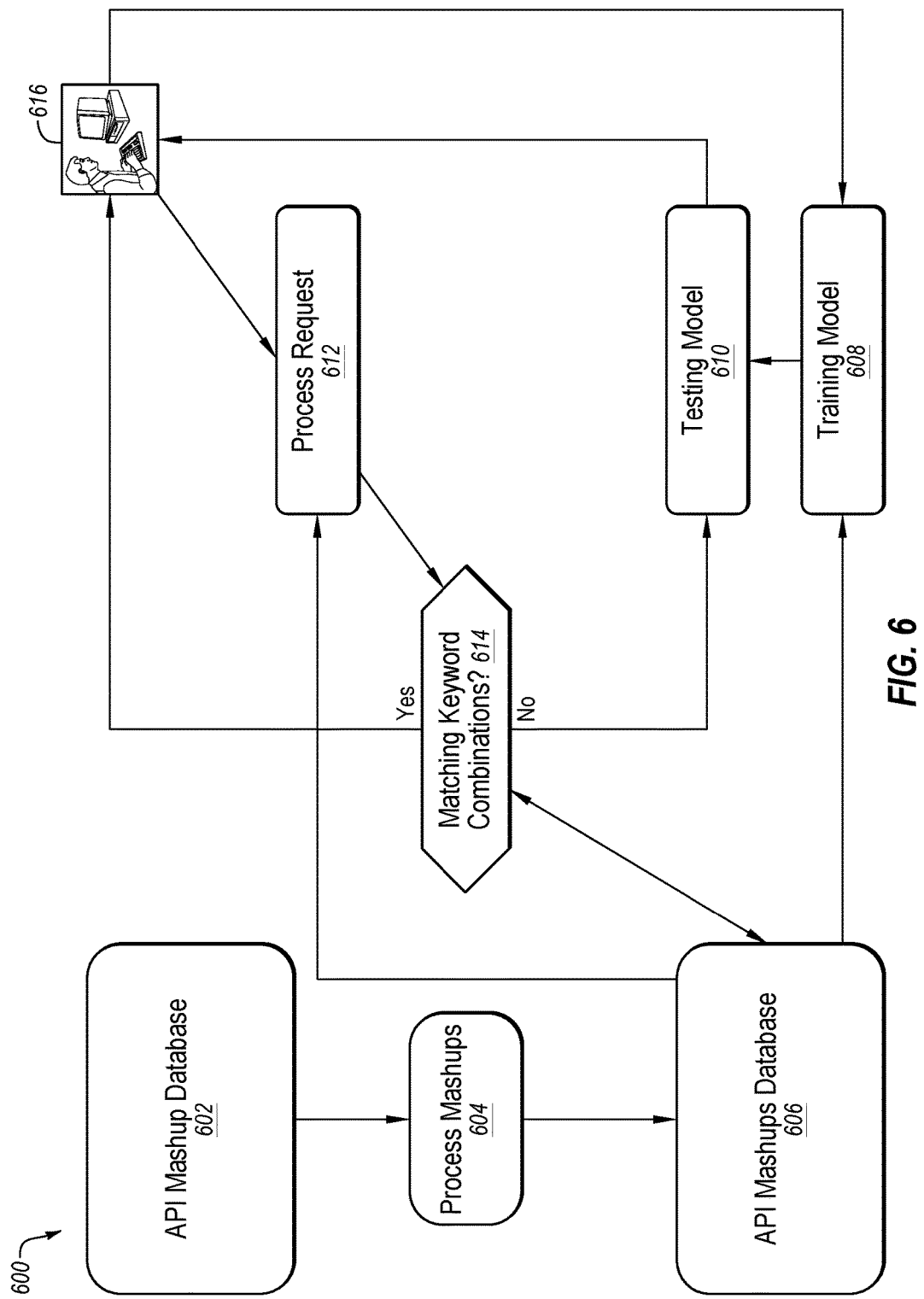
FIG. 6 is a diagram of an example flow that may be used for generating and processing one or more API mashups.

FIG. 6 is a diagram of an example flow 600 that may be used for generating and processing one or more API mashups, arranged in accordance with at least one embodiment described herein. Flow 600 may be performed by any suitable system, apparatus, or device. For example, system 100 (FIG. 1), system 1300 (FIG. 13), or one or more of the components thereof may perform one or more of the operations associated with flow 200. In these and other embodiments, program instructions stored on a computer readable medium may be executed to perform one or more of the operations of flow 200.

In some embodiments, one or more operations at one or more blocks and/or components of flow 600 may be performed via online processing. Further, one or more operations at one or more blocks and/or components of flow 600 may be performed via offline processing. For example, in at least one embodiments, operations at blocks 602, 604, and 606, and model 608 may be may be performed via offline processing, and operations at model 610 and blocks 612 and 614 may be may be performed via online processing.

At block 604, one or more generated API mashups from an API mashup database 602 may be processed to generate one or more refined (e.g., prioritized) API mashups of an API mashup database 606. According to various embodiments, API mashup database 602 may include one more API mashups generated via one or more embodiments disclosed herein. More specifically, API mashups of API mashup database 602 may be generated via one or more acts of method 200 (see FIG. 2) and/or via API mashup generator 104 (see FIG. 1). In some embodiments, API mashup database 602 may include API mashups generated for different domains (e.g., domain-specific API mashups), such as, for example only, medical, healthcare, business, office, science, ecommerce, etc.

For example, one or more API mashups of API mashup database 602 may be filtered, ranked, prioritized, and/or tested, via for example, input/output matching, API testing, and/or data format/unit compatibility verification, as described more fully herein, to generate the one or more refined API mashups of API mashup database 606. In accordance with various embodiments, in addition to refined API mashups for each sub-cluster keyword combination, API mashup database 606 may further include the sub-cluster keyword combinations.

According to various embodiments, processing operations (e.g., at block 604) may be performed alone or in combination to filter and/or rank the API mashups. For example, the operations may be performed sequentially or in parallel. In some embodiments, API mashups that successfully pass one or more operations (e.g., filtering, testing, etc.) may be prioritized as high priority mashups and/or valid API mashups, and, in at least some embodiments, may be ranked based on weights assigned for each operation (e.g., filtering, testing, etc.). In some embodiments, API mashups may be prioritized as low priority mashups and/or invalid API mashups. Further, in some embodiments, similarity scores may be considered (e.g., to break a tie between API mashups).

Figure 7:
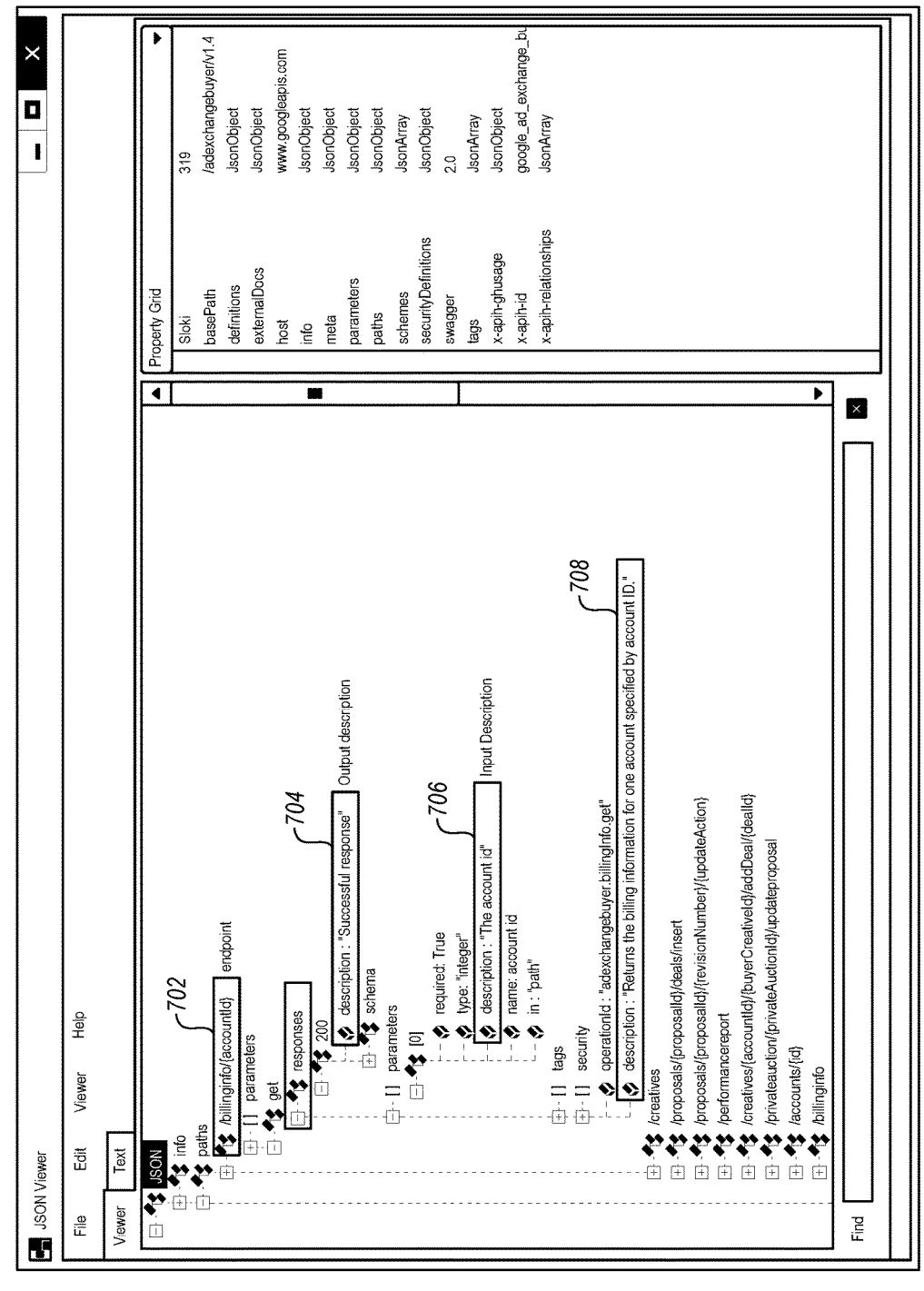
FIG. 7 depicts an example API including an endpoint, an input description, an output description, and an endpoint description.

FIG. 7 illustrates an example API 700 including an endpoint 702, an output description 704, an input description 706, and an endpoint description 708 in JSON format. For parsing descriptions, according to some embodiments, input descriptions and/or output descriptions for different endpoints may be assembled together for each API. In this example, the assembled description may be considered as API level input and/or output descriptions. For parsing descriptions according to other embodiments, input descriptions and/or output descriptions for each API endpoint may be separately considered. In this example, the descriptions may include API endpoint level input and/or output descriptions.

For example, with regard to input/output matching, for a generated API mashup (e.g., API_1, API_2), input/output descriptions of the API mashup may be identified and/or verified, and similarity scores may be calculated. For example, for an API mashup, if a similarity score is relatively high, either between API_1's input and API_2's output, or API_1's output and API_2's input, the API mashup may be designated as a high priority API and/or recommended (e.g., to a developer).

According to some embodiments, similarity scores between two different APIs (e.g. API1 and API2) may be calculated. As one example, API1 (input description)–API2 (output description) may be used for calculating a similarity score. As another example, API1 (output description)–API2 (input description) may be used for calculating a similarity score. In some embodiments, if an API's input or output description is "null," (e.g., the description for a given API is not included in API database block 102) the description may not be involved in the computation.

Further, in some embodiments, similarity analysis measurements may be based on descriptions of APIs. More specifically, the descriptions of each API in an API mashup may be separated into sentences, "stop" words and/or symbols may be removed, a word stemming operation may be performed, and NLP techniques may be used to convert each sentence into a word vector. Further, a hamming distance, for example, or other similarity metrics, among word vectors, may be computed. An average similarity score may be equal to sum (hamming distances)/total number of computations.

As an example, assuming the description of an API ("API1") includes two sentences (e.g., API1_s1 and API1_s2) and the description of another API ("API2") includes three sentences (e.g., API2_s1, API2_s2, and API2_s3), the hamming distance between every two sentences (Ham(API1_s1, API2_s1)) may be computed, and the similarity score may be equal to (Ham(API1_s1, API2_s1)+Ham(API1_s1, API2_s2)+Ham(API1_s1, API2_s3)+Ham(API1_s2, API2_s1)+Ham(API1_s2, API2_s2)+Ham(API1_s2, API2_s3))/6.

Figure 8:
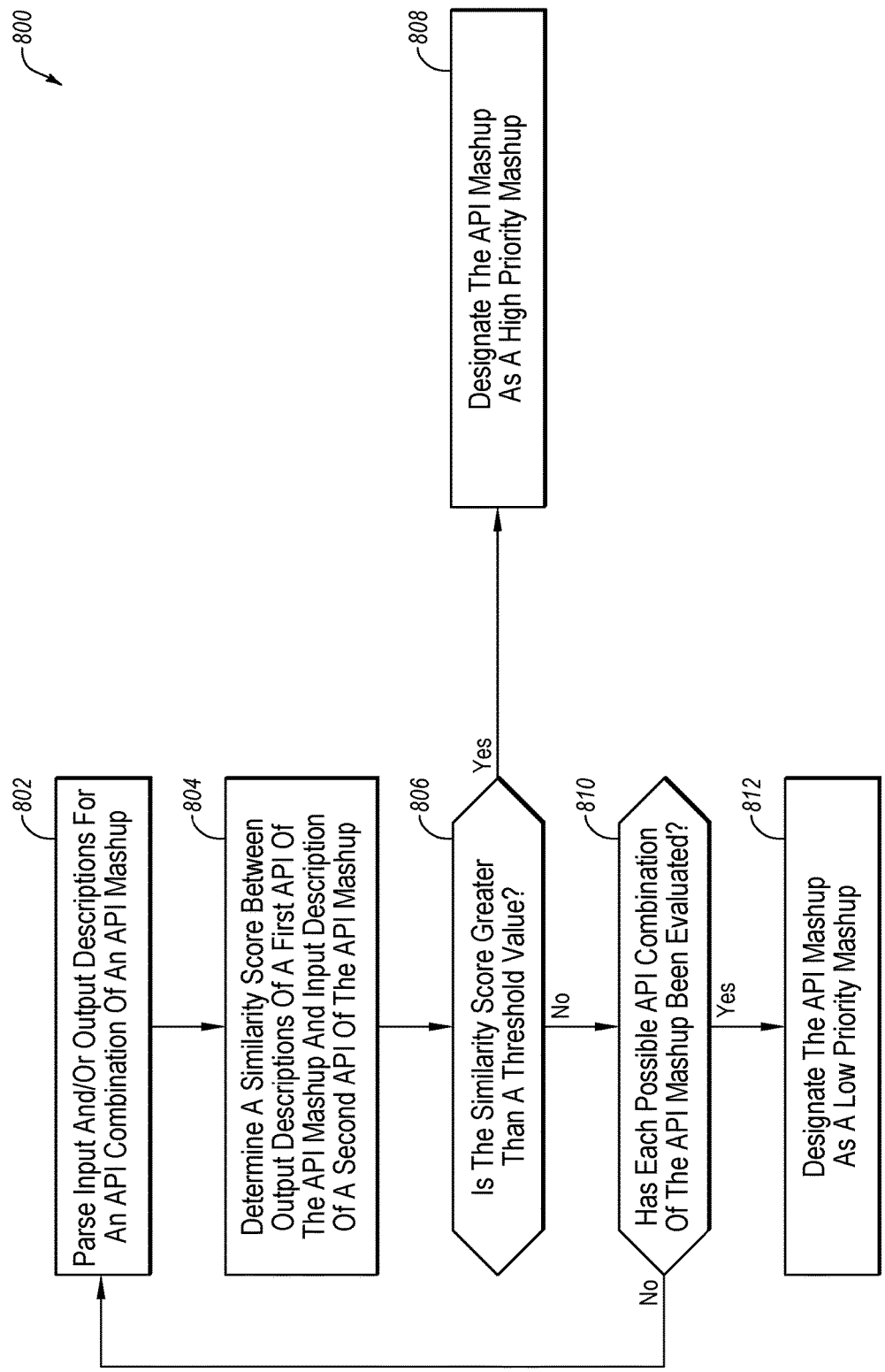
FIG. 8 shows an example flow diagram of a method of processing one or more API mashups.

In some embodiments, similarity scores may be calculated between two different API/endpoints (e.g. API1/endpoint_x and API2/endpoint_y). In one example, API1/endpoint_x (input description)–API2/endpoint_y (output description) may be used for calculating a similarity score. In another example, API1/endpoint_x (output description)–API2/endpoint_y (input description) may be used for calculating a similarity score. In some embodiments, if an API/endpoint's input or output description is "null," (e.g., the description for a given API's endpoint is not included in API database block 102) the description may not be involved in the computation FIG. 8 shows an example flow diagram of a method 800 of processing (e.g., filtering, ranking, and/or prioritizing) one or more API mashups, arranged in accordance with at least one embodiment described herein. Although illustrated as discrete blocks, various blocks may be divided into additional blocks, combined into fewer blocks, or eliminated, depending on the desired implementation. For example, method 800 may be performed at block 604 of FIG. 6.

In some embodiments, method 800 may be performed by one or more devices and/or systems, such as system 100 of FIG. 1 and/or system 1300 of FIG. 13. For instance, processor 1310 of FIG. 13 may be configured to execute computer instructions stored on memory 1330 to perform functions and operations as represented by one or more of the blocks of method 800.

At block 802, input and/or output descriptions for an API combination of an API mashup may be parsed, and method 800 may proceed to block 804. More specifically, for example, for an API combination of an API mashup (e.g., API_1, API_2), input and output descriptions of API_1 and API_2 may be parsed. For example, processor 1310 of FIG. 13 may parse input and/or output descriptions for an API combination of an API mashup.

At block 804, a similarity score between output descriptions of a first API of an API mashup and input descriptions of a second API of the API mashup may be determined, and method 800 may proceed to block 806. More specifically, for example, a similarity score between API_1's output descriptions and API_2's input descriptions may be determined. For example, processor 1310 of FIG. 13 may determine the similarity score between output descriptions of the first API of the API mashup and input descriptions of the second API of the API mashup.

At block 806, a determination may be made as to whether the determined similarity score is greater than a threshold value. For example, processor 1310 of FIG. 13 may compare the determined the similarity score to the threshold value to determine whether the similarity score is greater than the threshold value. If the determined similarity score is greater than the threshold value, method 800 may proceed to block 808. If the determined similarity score is less than or equal to the threshold value, method 800 may proceed to block 810.

At block 808, the API mashup may be designated as a high priority mashup. For example, the API may be designated (e.g., prioritized) as a high priority mashup via processor 1310 of FIG. 13.

At block 810, a determination may be made as to whether each possible API combination for the API mashup has been evaluated. For example, for the API mashup including API_1 and API_2, a determination may be made as to whether both API_1->API_2 and API_2->API_1 have been evaluated. More specifically, it may be determined whether a similarity score between output descriptions of API_1 and input descriptions of API_2 has been evaluated, and whether a similarity score between output descriptions of API_2 and input descriptions of API_1 has been evaluated. If each possible API combination for the API mashup has been evaluated, method 800 may proceed to block 812, wherein the API mashup may be designated (e.g., prioritized) as a low priority mashup. For example, determining whether each possible API combination for the API mashup has been evaluated may be performed via processor 1310 of FIG. 13. If each possible API combination for the API mashup has not been evaluated, method 800 may return to block 802 wherein another API combination may be identified.

Modifications, additions, or omissions may be made to method 800 without departing from the scope of the present disclosure. For example, the operations of method 800 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

Figure 9:
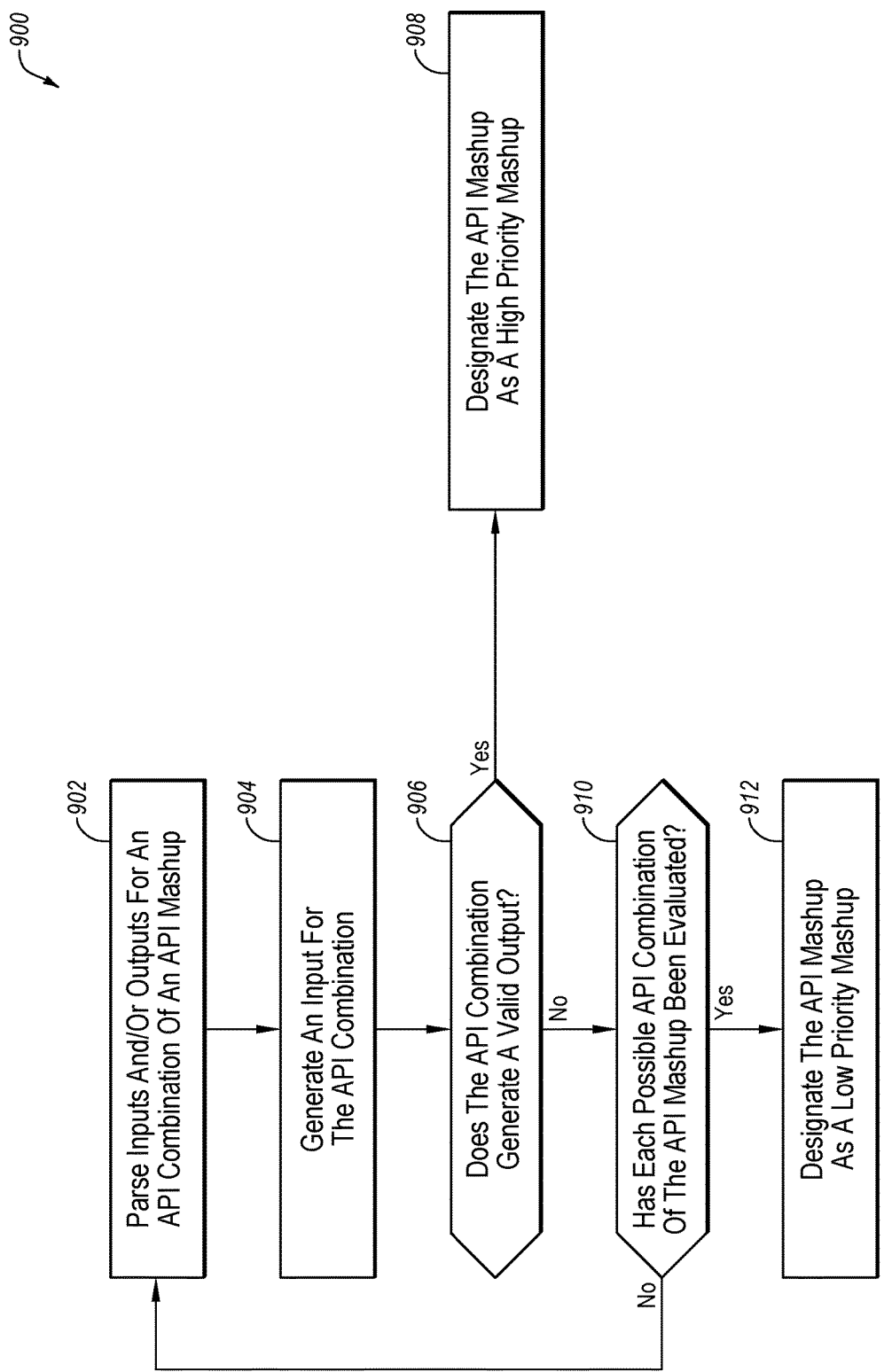
FIG. 9 shows an example flow diagram of another method of processing one or more API mashups.

FIG. 9 shows an example flow diagram of another method 900 of processing (e.g., filtering, ranking, and/or prioritizing) one or more API mashups, arranged in accordance with at least one embodiment described herein. Although illustrated as discrete blocks, various blocks may be divided into additional blocks, combined into fewer blocks, or eliminated, depending on the desired implementation. For example, method 900 may be performed at block 604 of FIG. 6.

In some embodiments, method 900 may be performed by one or more devices and/or systems, such as system 100 of FIG. 1 and/or system 1300 of FIG. 13. For instance, processor 1310 of FIG. 13 may be configured to execute computer instructions stored on memory 1330 to perform functions and operations as represented by one or more of the blocks of method 900.

For API testing, for a given API mashup (e.g., of database 602 of FIG. 6), automatic API testing may be used to prioritize the API mashup and/or verify whether or not the API mashup is valid. If the API mashup passes the automatic API testing, the API mashup may be designated as a high priority mashup and/or may be recommended to an application developer. If the API mashup does not pass the automatic API testing, the API mashup may designated as a low priority mashup.

At block 902, inputs and/or outputs for an API combination of an API mashup may be parsed, and method 900 may proceed to block 904. More specifically, for example, for an API combination of an API mashup (e.g., API_1, API_2), input and outputs (e.g., types, descriptions, etc.) of each API may be parsed. As one example, for a weather API, an input may include a name of a city or a zip code, and an output may include a temperature. For example, inputs and/or outputs for an API combination of an API mashup may be parsed via processor 1310 of FIG. 13.

At block 904, an input for the API combination may be generated, and method 900 may proceed to block 906. More specifically, for example, based on semantic and/or input types of the API combination, the input for the API combination, which may be used for testing, may generated. As one example, for a weather API, an input may include a name of a city or a zip code. In this case, a city name (e.g. Sunnyvale) or a zip code (e.g. 94085) may be automatically generated from the knowledge base. For example, an input for an API combination may be generated via processor 1310 of FIG. 13.

At block 906, a determination may be made as to whether the API combination may generate a valid output. For example, the determination as to whether the API combination may generate a valid output may be made via processor 1310 of FIG. 13. If it is determined that the API combination may generate a valid (e.g., correct) output, method 900 may proceed to block 908, wherein the API mashup may be designated (e.g., prioritized) as a high priority mashup. If it is determined that the API combination may not generate a valid output, method 1000 may proceed to block 910.

At block 910, a determination may be made as to whether each possible API combination for the API mashup has been evaluated. For example, for the API mashup including API_1 and API_2, a determination may be made as to whether both API_1->API_2 and API_2->API_1 have been evaluated. If each possible API combination for the API mashup has been evaluated, method 900 may proceed to block 912, wherein the API mashup may be designated (e.g., prioritized) as a low priority mashup. For example, the determination as to whether each possible API combination has been evaluated may be made via processor 1310 of FIG. 13. If each possible API combination for the API mashup has not been evaluated, method 900 may return to block 902, wherein another API combination may be identified.

Modifications, additions, or omissions may be made to method 900 without departing from the scope of the present disclosure. For example, the operations of method 900 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

Figure 10:
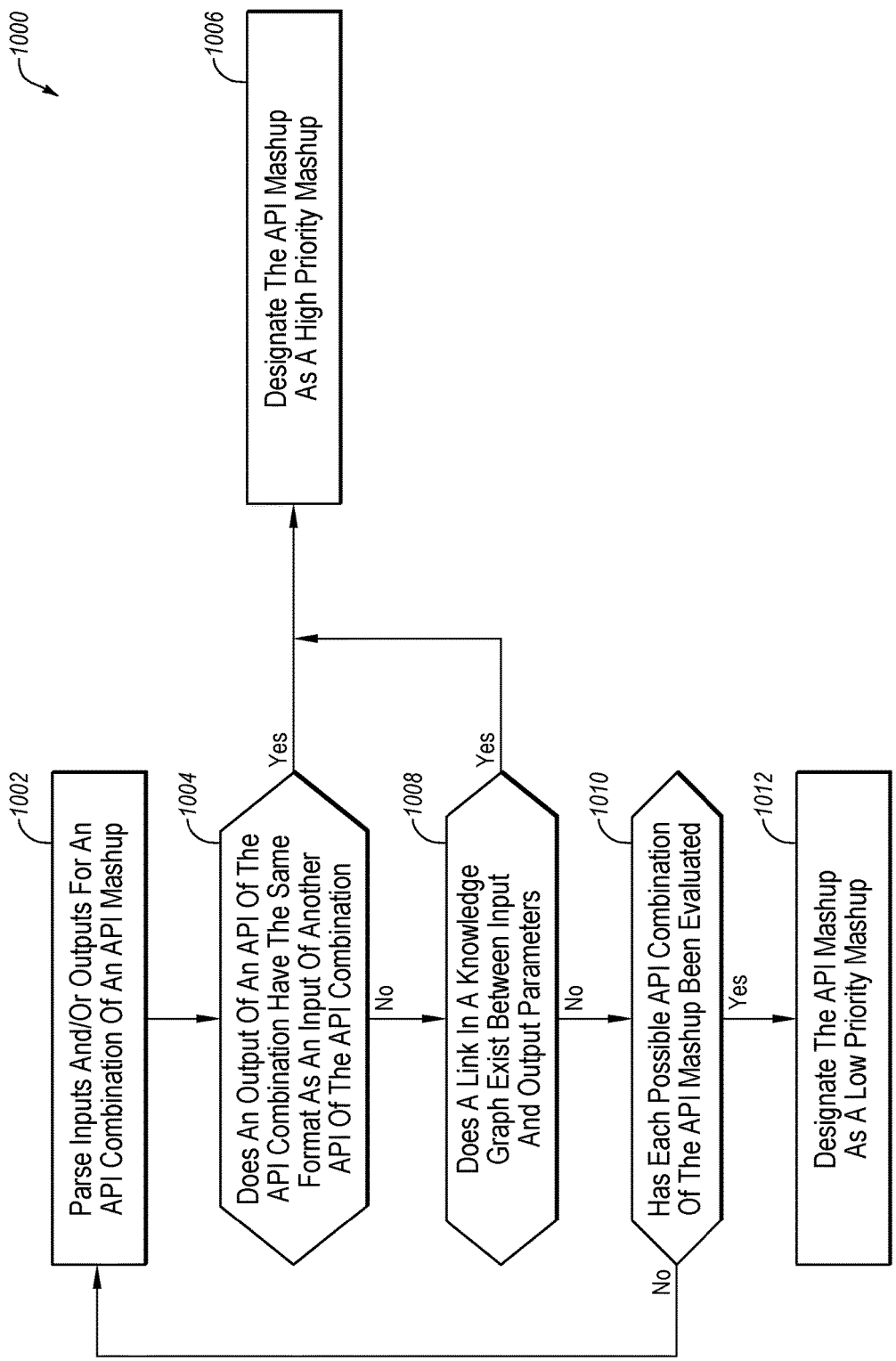
FIG. 10 shows an example flow diagram of yet another method of processing one or more API mashups.

FIG. 10 shows an example flow diagram of yet another method 1000 of processing (e.g., filtering, ranking, and/or refining) one or more API mashups, arranged in accordance with at least one embodiment described herein. Although illustrated as discrete blocks, various blocks may be divided into additional blocks, combined into fewer blocks, or eliminated, depending on the desired implementation. For example, method 1000 may be performed at block 604 of FIG. 6.

In some embodiments, method 1000 may be performed by one or more devices and/or systems, such as system 100 of FIG. 1 and/or system 1300 of FIG. 13. For instance, processor 1310 of FIG. 13 may be configured to execute computer instructions stored on memory 1330 to perform functions and operations as represented by one or more of the blocks of method 1000.

For a given API mashup (e.g., of database 602 of FIG. 6), the input/output data format may be analyzed to verify whether or not the API mashup is plausible. If the API mashup has a matching input/output data format, or there exists a link in a knowledge graph between input and output parameters (e.g., that indicates a relationship including the data format conversion (e.g., converting from XML to JSON format, or data unit conversion (e.g., to convert the unit of temperature from Celsius Fahrenheit)), the API mashup may be designated (e.g., prioritized) as a high priority mashup and/or may recommended to an application developer.

In some embodiments, there may be multiple output and input parameters. According to some embodiments, as long as there is a match between one API's output data format/unit to another API's input data format/unit, the API mashup may have a compatible data format, and the API mashup may be designated (e.g., prioritized) as a high priority mashup and/or may recommended to an application developer.

At block 1002, inputs and/or outputs for each API in an API combination of an API mashup may be parsed, and method 1000 may proceed to block 1004. More specifically, for example, for an API combination of an API mashup (e.g., API_1, API_2), input and outputs (e.g., types, descriptions, etc.) of API_1 and API_2 may be parsed. For example, inputs and/or outputs for an API combination of an API mashup may be parsed via processor 1310 of FIG. 13.

At block 1004, a determination may be made as to whether an output of an API of the API combination has the same data format and/or unit as an input of another API of the API combination. More specifically, for example, based on semantic and/or input/output types the APIs in the API combination, it may be determined whether an output of an API of the API combination has the same data format and/or unit as an input of another API of the API combination For example, the determination as to whether an output of an API of the API combination has the same data format and/or unit as an input of another API of the API combination may be made via processor 1310 of FIG. 13.

If an output of an API of the API combination has the same data format and/or unit as an input of another API of the API combination, method 1000 may proceed to block 1006, wherein the API mashup may be designated (e.g., prioritized) as a high priority mashup. If an output of an API of the API combination does not have the same data format and/or unit as an input of another API of the API combination, method 1000 may proceed to block 1008.

At block 1008, a determination may be made as to whether a link exists in a knowledge graph between input and output parameters for a data format/unit conversion. For example, the determination as to whether a link exists in a knowledge graph between input and output parameters for a data format/unit conversion may be made via processor 1310 of FIG. 13. If it is determined that a link exists in a knowledge graph between input and output parameters for a data format/unit conversion, method 1000 may proceed to block 1006, wherein the API mashup may be designated (e.g., prioritized) a high priority mashup. If it is determined that a link does not exist in a knowledge graph between input and output parameters for a data format/unit conversion, method 1000 may proceed to block 1010.

At block 1010, a determination may be made as to whether each possible API combination for the API mashup has been evaluated. For example, for the API mashup including API_1 and API_2, a determination may be made as to whether both API_1->API_2 and API_2->API_1 have been evaluated. If each possible API combination for the API mashup has been evaluated, method 1000 may proceed to block 1012, wherein the API mashup may be designated (e.g., prioritized) as an invalid mashup. For example, the determination as to whether each possible API combination for the API mashup has been evaluated may be made via processor 1310 of FIG. 13. If each possible API combination for the API mashup has not been evaluated, method 1000 may return to block 1002 wherein another API combination may be identified.

Modifications, additions, or omissions may be made to method 1000 without departing from the scope of the present disclosure. For example, the operations of method 1000 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

With reference again to FIG. 6, although API mashup database 606 (e.g., including sub-cluster key word combinations and API mashups for each combination) has been filtered and/or refined, database 606, in some embodiments, may not evaluate all API mashups and/or keyword combinations (e.g., via offline processing). Thus, various embodiments of the present disclosure may include utilizing one or more learning models (e.g., machine learning and/or deep learning models) to predict whether or not some APIs may be combined and used for a plausible API mashup.

Figures 11A, 11B:
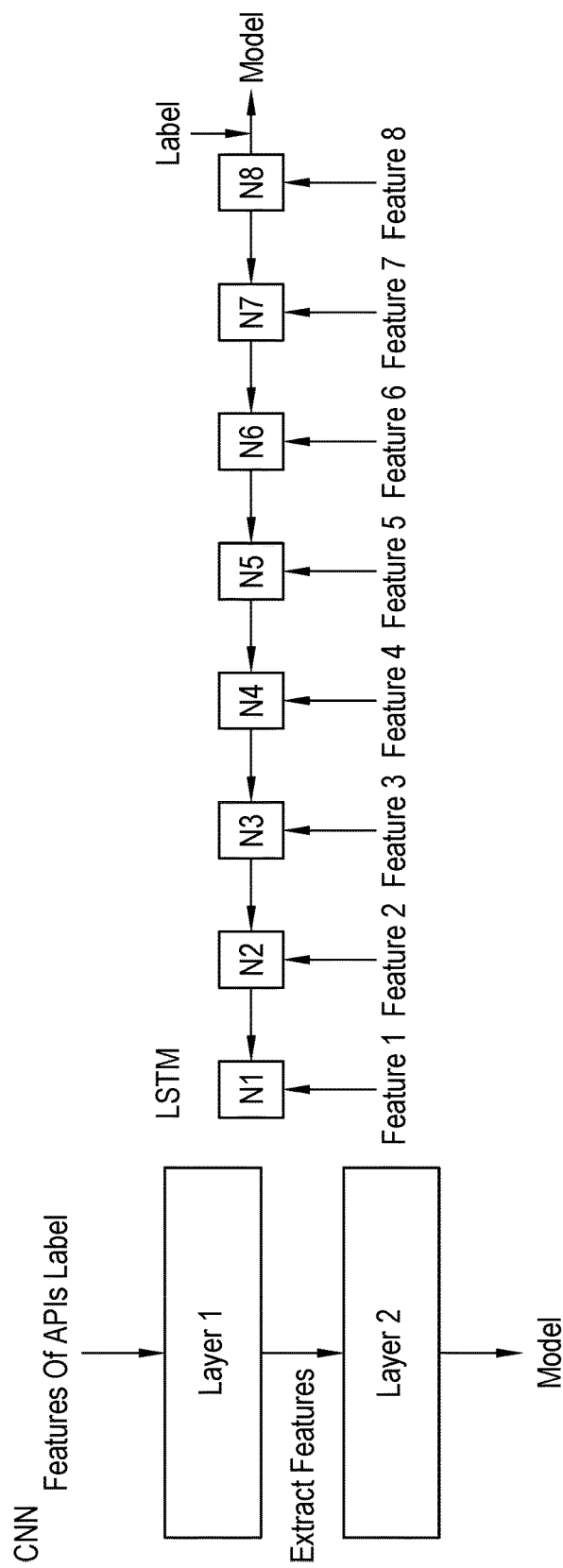
FIGS. 11A and 11B depicts various example learning algorithms.

For example, in some embodiments, at least one model may include a training model 608, and at least one other model may include a testing module 610. Although model 608 and model 610 are illustrated as two models, model 608 and model 610 could be the same machine learning or deep learning model. According to some embodiments, the one or more models may include information related to features of API mashups (e.g., specification information regarding each API) such as title, category, primary category, secondary category, link, description, protocol formats, etc. Further, for example, one or more machine learning and/or deep learning algorithms may be utilized, such as CNN (2 layers as an example; see FIG. 11A) and/or LSTM (8 nodes as an example; see FIG. 11B).

In some embodiments, one or more training datasets, which may include data from API mashups database 606, may be received by training model 608. Further, feedback from a developer 616 (e.g., a developer's selection of API mashups (e.g., like or dislike)) may be received at model 608 and may be used to generate and/or update training model 608. For different machine learning or deep learning algorithms, the model training may require only the valid API mashup dataset, or both of the valid and invalid API mashup dataset, which may prioritized in block 606.

Figure 12:
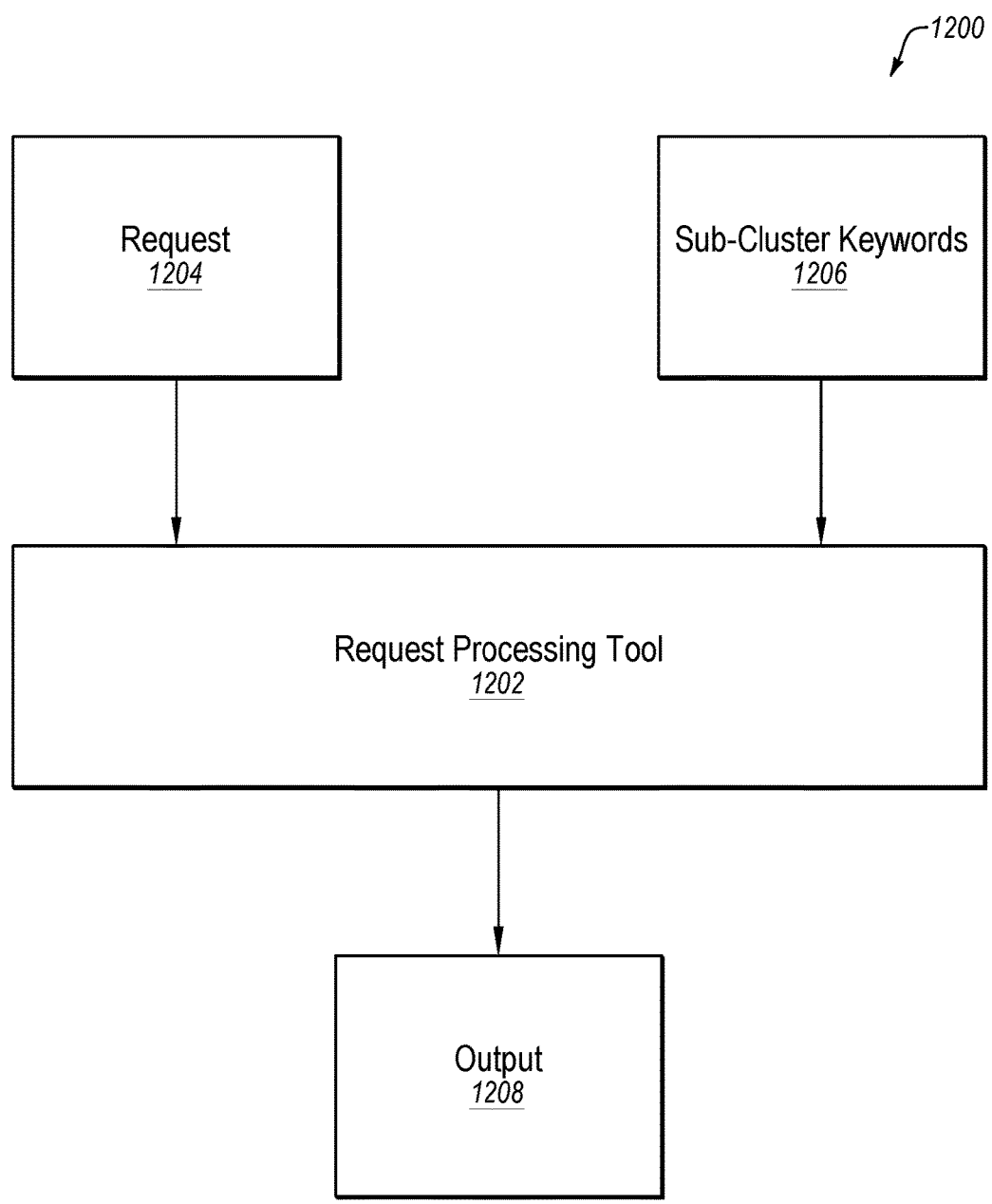
FIG. 12 illustrates an example system including a processing tool for generating one or more keyword combinations.

At block 612, a request (e.g., from a third party, such as developer 616) may be processed. For example, as illustrated in flow 600, request processing may be based on one or more inputs, such as a request (also referred to herein as a "query") (e.g., natural language description of service requirements) from developer 616 and/or one or more API mashups and/or sub-cluster keywords from API mashup database 606. Further, in response to the request processing, an output, which may include one or more keyword combinations, may be generated. An example system 1200 of FIG. 12, a request processing tool 1202 may receive one or more inputs (e.g., a request 1204 and sub-cluster keywords 1206), and generate an output 1208, which may include one or more keyword combinations.

Further, in some embodiments, at block 614 of FIG. 6, a keyword combination generated (e.g., at block 612) may be compared to keyword combinations of database 606 to determine if there is a match between the generated keyword combination (e.g., from the query) and keyword combinations of database 606. If a match exists, the associated API mashups from database 606 may be provided to developer 616. If a match does not exist, for each keyword of the keyword combination, related APIs (e.g., from block 606) may be identified, and all the possible API combinations for the identified APIs may be identified.

Further, each of the API combinations may be conveyed to model 610, and model 610, which is trained based on the machine learning or deep learning algorithms and existing API mashup dataset of block 606, may generate an output, such as a label (e.g., "1" or "0"), that may represent whether or not the received APIs may be combined as a valid API mashup. For example, if the label is 1, the API mashup may be designated (e.g., prioritized) as a high priority mashup and/or may be provided to developer 616 as a plausible API mashup. Further, for example, if the label is 0, the API mashup may be designated (e.g., prioritized) as a low priority mashup.

Further, according to some embodiments, in response to a recommended API mashup, developer 616 may select whether he/she likes or dislikes the API mashup. This selection may be provided as feedback to the learning model (e.g., at model 608) to update and/or refine the learning model.

In some embodiments, if an API mashup is originally labeled with a 1 (e.g., valid/high priority API mashup) (e.g., via testing model 608), but a number of developers (e.g., a majority of developers) do not like the API mashup, the API mashup may be relabeled with a "0." In some embodiments, if an API mashup is originally labeled with a "0" (e.g., invalid/low priority API mashup), but a number of developers (e.g., a majority of developers) like the API mashup, the API mashup may be relabeled as a "1."

Further, according to some embodiments, any datasets (e.g., a new dataset) may be used to re-train the learning models. Moreover, in some embodiments, model 608, which may be trained (e.g., via information from database 606 and/or feedback from developer 616), may update model 610 to enable model 610 to more accurately predict whether or not received APIs may be combined as a plausible API mashup.

FIG. 13 is a block diagram of an example computing system 1300, in accordance with at least one embodiment of the present disclosure. For example, system 100 (see FIG. 1), system 500 (see FIG. 5), system 1200 (see FIG. 12), or one or more components thereof, may be implemented as computing system 1300. Computing system 1300 may include a desktop computer, a laptop computer, a server computer, a tablet computer, a mobile phone, a smartphone, a personal digital assistant (PDA), an e-reader device, a network switch, a network router, a network hub, other networking devices, or other suitable computing device.

Computing system 1300 may include processor 1310, a storage device 1320, a memory 1330, and a communication device 1340. Processor 1310, storage device 1320, memory 1330, and/or communication device 1340 may all be communicatively coupled such that each of the components may communicate with the other components. Computing system 1300 may perform any of the operations described in the present disclosure.

In general, processor 1310 may include any suitable special-purpose or general-purpose computer, computing entity, or processing device including various computer hardware or software modules and may be configured to execute instructions stored on any applicable computer-readable storage media. For example, processor 1310 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 13, processor 1310 may include any number of processors configured to perform, individually or collectively, any number of operations described in the present disclosure.

In some embodiments, processor 1310 may interpret and/or execute program instructions and/or process data stored in storage device 1320, memory 1330, or storage device 1320 and memory 1330. In some embodiments, processor 1310 may fetch program instructions from storage device 1320 and load the program instructions in memory 1330. After the program instructions are loaded into memory 1330, processor 1310 may execute the program instructions.

For example, in some embodiments one or more of the processing operations of a device and/or system (e.g., an application program, a server, etc.) may be included in data storage 1320 as program instructions. Processor 1310 may fetch the program instructions of one or more of the processing operations and may load the program instructions of the processing operations in memory 1330. After the program instructions of the processing operations are loaded into memory 1330, processor 1310 may execute the program instructions such that computing system 1300 may implement the operations associated with the processing operations as directed by the program instructions.

Storage device 1320 and memory 1330 may include computer-readable storage media for carrying or having computer-executable instructions or data structures stored thereon. Such computer-readable storage media may include any available media that may be accessed by a general-purpose or special-purpose computer, such as processor 1310. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 1310 to perform a certain operation or group of operations.

In some embodiments, storage device 1320 and/or memory 1330 may store data associated with an API mashup generation system (e.g., API mashup generation system 100 of FIG. 1). For example, storage device 1320 and/or memory 1330 may store APIs, API combinations, API information (e.g., keywords, parameter descriptions, endpoint descriptions, categories, clusters, sub-clusters, etc.), and/or any other data related to an API mashup generation system.

Communication device 1340 may include any device, system, component, or collection of components configured to allow or facilitate communication between computing system 1300 and another electronic device. For example, communication device 1340 may include, without limitation, a modem, a network card (wireless or wired), an infrared communication device, an optical communication device, a wireless communication device (such as an antenna), and/or chipset (such as a Bluetooth device, an 802.6 device (e.g. Metropolitan Area Network (MAN)), a Wi-Fi device, a WiMAX device, cellular communication facilities, etc.), and/or the like. Communication device 640 may permit data to be exchanged with any network such as a cellular network, a Wi-Fi network, a MAN, an optical network, etc., to name a few examples, and/or any other devices described in the present disclosure, including remote devices.

Modifications, additions, or omissions may be made to FIG. 13 without departing from the scope of the present disclosure. For example, computing system 1300 may include more or fewer elements than those illustrated and described in the present disclosure. For example, computing system 1300 may include an integrated display device such as a screen of a tablet or mobile phone or may include an external monitor, a projector, a television, or other suitable display device that may be separate from and communicatively coupled to computing system 1300.

As used herein, the terms "module" or "component" may refer to specific hardware implementations configured to perform the operations of the module or component and/or software objects or software routines that may be stored on and/or executed by, for example, API mashup generator 104. In some embodiments, the different components and modules described herein may be implemented as objects or processes that execute on a computing system (e.g., as separate threads). While some of the system and methods described herein are generally described as being implemented in software (stored on and/or executed by system 1300), specific hardware implementations or a combination of software and specific hardware implementations are also possible and contemplated. In this description, a "computing entity" may include any computing system as defined herein, or any module or combination of modules running on a computing device, such as system 1300.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method of generating application program interface (API) mashups, the method comprising:
   grouping, via at least one processor, a plurality of APIs into a plurality of sub-clusters based on at least one keyword for each API of the plurality of APIs;
   identifying, via the at least one processor, a plurality of keyword combinations for the plurality of sub-clusters based on real-world data and two or more keywords for the plurality of sub-clusters;
   determining, via the at least one processor, a plurality of possible API mashups including two or more APIs of the plurality of APIs for the plurality of keyword combinations; and
   processing, via the at least one processor, the plurality of possible API mashups to generate at least one prioritized API mashup of the plurality of possible API mashups, the at least one prioritized API mashup associated with at least one keyword combination of the plurality of keyword combinations.

2. The method of claim 1, wherein processing the plurality of possible API mashups comprises, for each API combination of each API mashup of the plurality of possible API mashups:
   comparing an input of a first API of an API combination of an API mashup with an output of a second API of the API combination of the API mashup;
   calculating a similarity score between an input of a first API of an API combination with an output of a second API; and
   designating the API mashup as a high priority API mashup if the similarity score is above a threshold value.

3. The method of claim 1, wherein processing the plurality of possible API mashups comprises, for each API combination of each API mashup of the plurality of possible API mashups:
   generating an input for an API combination of an API mashup;
   determining whether the API combination generates a valid output based on the generated input; and
   designating the API mashup as a high priority API mashup if the generated output is valid.

4. The method of claim 1, wherein processing the plurality of possible API mashups comprises, for each API combination of each API mashup of the plurality of possible API mashups:
   determining whether an output of a first API of an API combination of an API mashup has a data format matching a data format of an input of a second API of the API combination of the API mashup;
   determining whether at least one link exists in a knowledge graph between output parameters of the first API and input parameters of the second API; and
   designating the API mashup as a high priority API mashup if either the output of the first API has a data format matching the data format of the input of the second API or at least one link exists in the knowledge graph between the output parameters of the first API and the input parameters of the second API.

5. The method of claim 1, further comprising:
   receiving an API mashup request from a third party;
   processing, via the at least one processor, the API mashup request to identify one or more keyword combinations for the API mashup request;
   comparing, via the at least one processor, the one or more keyword combinations for the API mashup request with the at least one keyword combination for the at least one prioritized API mashup;
   in response to the one or more keyword combinations for the API mashup request matching the at least one keyword combination for the at least one prioritized API mashup, providing the at least one prioritized API mashup to the third party; and
   in response to the one or more keyword combinations for the API mashup request not matching the at least one keyword combination for the at least one prioritized API mashup:
      conveying the at least one prioritized API mashup to at least one learning model;
      determining, via the at least one learning model, whether the at least one prioritized API mashup is a plausible API mashup; and
      in response to determining that the at least one prioritized API mashup is a plausible API mashup, providing the at least one prioritized API mashup to the third party.

6. The method of claim 5, further comprising:
   receiving feedback from the third party regarding the at least one prioritized API mashup; and updating the at least one learning model based on the feedback from the third party.

7. The method of claim 1, further comprising providing the at least one prioritized API mashup to a third party.

8. One or more non-transitory computer-readable media that include instructions that, when executed by one or more processing systems, are configured to cause the processing system to perform operations, the operations comprising:
   grouping a plurality of APIs into a plurality of sub-clusters based on at least one keyword for each API of the plurality of APIs;
   identifying a plurality of keyword combinations for the plurality of sub-clusters based on real-world data and two or more keywords for the plurality of sub-clusters;
   determining a plurality of possible API mashups including two or more APIs of the plurality of APIs for the plurality of keyword combinations; and
   processing the plurality of possible API mashups to generate at least one prioritized API mashup of the plurality of possible API mashups, the at least one prioritized API mashup associated with at least one keyword combination of the plurality of keyword combinations.

9. The computer-readable media of claim 8, wherein processing the plurality of possible API mashups comprises, for each API combination of each API mashup of the plurality of possible API mashups:
  comparing an input of a first API of an API combination of an API mashup with an output of a second API of the API combination of the API mashup;
  calculating a similarity score between an input of a first API of an API combination with an output of a second API; and
  designating the API mashup as a high priority API mashup if the similarity score is above a threshold value.

10. The computer-readable media of claim 8, wherein processing the plurality of possible API mashups comprises, for each API combination of each API mashup of the plurality of possible API mashups:
  generating an input for an API combination of an API mashup;
  determining whether the API combination generates a valid output based on the generated input; and
  designating the API mashup as a high priority API if the generated output is valid.

11. The computer-readable media of claim 8, wherein processing the plurality of possible API mashups comprises, for each API combination of each API mashup of the plurality of possible API mashups:
  determining whether an output of a first API of an API combination of an API mashup has a data format matching a data format of an input of a second API of the API combination of the API mashup;
  determining whether at least one link exists in a knowledge graph between output parameters of the first API and input parameters of the second API; and
  designating the API mashup as a high priority API mashup if either the output of the first API has a data format matching the data format of the input of the second API or at least one link exists in the knowledge graph between the output parameters of the first API and the input parameters of the second API.

12. The computer-readable media of claim 8, the operations further comprising:
  receiving an API mashup request from a third party;
  processing the API mashup request to identify one or more keyword combinations for the API mashup request;
  comparing the one or more keyword combinations for the API mashup request with the at least one keyword combination for the at least one prioritized API mashup;
  in response to the one or more keyword combinations for the API mashup request matching the at least one keyword combination for the at least one prioritized API mashup, providing the at least one prioritized API mashup to the third party; and
  in response to the one or more keyword combinations for the API mashup request not matching the at least one keyword combination for the at least one prioritized API mashup:
    conveying the at least one prioritized API mashup to at least one learning model;
    determining, via the at least one learning model, whether the at least one prioritized API mashup is a plausible API mashup; and
    in response determining that the at least one prioritized API mashup is a plausible API mashup, providing the at least one prioritized API mashup to the third party.

13. The computer-readable media of claim 12, the operations further comprising:
  receiving feedback from the third party regarding the at least one prioritized API mashup; and
  updating the at least one learning model based on the feedback from the third party.

14. The computer-readable media of claim 8, the operations further comprising providing the at least one prioritized API mashup to a third party.

15. A system, comprising:
  one or more processors configured to:
    group a plurality of APIs into a plurality of sub-clusters based on at least one keyword for each API of the plurality of APIs;
    identify a plurality of keyword combinations for the plurality of sub-clusters based on real-world data and two or more keywords for the plurality of sub-clusters;
    determine a plurality of possible API mashups including two or more APIs of the plurality of APIs for the plurality of keyword combinations; and
    process the plurality of possible API mashups to generate at least one prioritized API mashup of the plurality of possible API mashups, the at least one prioritized API mashup associated with at least one keyword combination of the plurality of keyword combinations.

16. The system of claim 15, wherein, for each API combination of each API mashup of the plurality of possible API mashups, the one or more processors are further configured to:
  compare an input of a first API of an API combination of an API mashup with an output of a second API of the API combination of the API mashup;
  calculate a similarity score between an input of a first API of an API combination with an output of a second API; and
  designate the API mashup as a high priority API mashup if the similarity score is above a threshold value.

17. The system of claim 15, wherein, for each API combination of each API mashup of the plurality of possible API mashups, the one or more processors are further configured to:
  generate an input for an API combination of an API mashup;
  determine whether the API combination generates a valid output based on the generated input; and
  designate the API mashup as a high priority API mashup if the generated output is valid.

18. The system of claim 15, wherein, for each API combination of each API mashup of the plurality of possible API mashups, the one or more processors are further configured to:
  determine whether an output of a first API of an API combination of an API mashup has a data format matching a data format of an input of a second API of the API combination of the API mashup;
  determine whether at least one link exists in a knowledge graph between output parameters of the first API and input parameters of the second API; and
  designate the API mashup as a high priority API mashup if either the output of the first API has a data format matching the data format of the input of the second API or at least one link exists in the knowledge graph between the output parameters of the first API and the input parameters of the second API.

19. The system of claim 15, wherein, the one or more processors are further configured to:

receive an API mashup request from a third party;

process the API mashup request to identify one or more keyword combinations for the API mashup request;

compare the one or more keyword combinations for the API mashup request with the at least one keyword combination for the at least one prioritized API mashup;

in response to the one or more keyword combinations for the API mashup request matching the at least one keyword combination for the at least one prioritized API mashup, provide the at least one prioritized API mashup to the third party; and in response to the one or more keyword combinations for the API mashup request not matching the at least one keyword combination for the at least one prioritized API mashup:

convey the at least one prioritized API mashup to at least one learning model;

determine, via the at least one learning model, whether the at least one prioritized API mashup is a plausible API mashup; and in response determining that the at least one prioritized API mashup is a plausible API mashup, provide the at least one prioritized API mashup to the third party.

20. The system of claim 19, wherein the one or more processors are further configured to:

receive feedback from the third party regarding the at least one prioritized API mashup; and update the at least one learning model based on the feedback from the third party.

* * * * *